(12) United States Patent
Diaz et al.

(10) Patent No.: US 11,029,548 B2
(45) Date of Patent: Jun. 8, 2021

(54) IN-FLIGHT ENTERTAINMENT SYSTEMS AND MONITOR ASSEMBLIES FOR IN-FLIGHT ENTERTAINMENT SYSTEMS

(71) Applicant: Panasonic Avionics Corporation, Lake Forest, CA (US)

(72) Inventors: David Diaz, Rancho Santa Margarita, CA (US); Steven Vazquez, Alta Loma, CA (US)

(73) Assignee: PANASONIC AVIONICS CORPORATION, Lake Forest, CA (US)

(*) Notice: Subject to any disclaimer, the term of this patent is extended or adjusted under 35 U.S.C. 154(b) by 0 days.

(21) Appl. No.: 16/571,021

(22) Filed: Sep. 13, 2019

(65) Prior Publication Data

US 2021/0080772 A1 Mar. 18, 2021

(51) Int. Cl.
*G02F 1/1333* (2006.01)
*B60K 35/00* (2006.01)
*H04N 5/655* (2006.01)
*G06F 3/041* (2006.01)
*G06F 1/16* (2006.01)

(52) U.S. Cl.
CPC ........ *G02F 1/133308* (2013.01); *B60K 35/00* (2013.01); *G06F 1/1626* (2013.01); *G06F 3/041* (2013.01); *H04N 5/655* (2013.01); *B60K 2370/60* (2019.05); *G02F 1/13332* (2021.01); *G02F 1/133314* (2021.01); *G02F 1/133331* (2021.01); *G02F 1/133334* (2021.01); *G02F 2201/46* (2013.01)

(58) Field of Classification Search
None
See application file for complete search history.

(56) References Cited

U.S. PATENT DOCUMENTS

| | | | | |
|---|---|---|---|---|
| 6,561,600 B1* | 5/2003 | Seeley | ............ | G06F 1/1601 312/257.1 |
| 7,188,400 B1* | 3/2007 | Beseth | ............ | B64D 43/00 29/428 |
| 7,597,393 B1* | 10/2009 | Tuccinardi | ........ | B60R 11/0211 297/188.04 |
| 8,274,783 B2* | 9/2012 | Polizzotto | ........ | H05K 7/1412 361/679.01 |
| 8,369,082 B2* | 2/2013 | Madonna | ......... | G06F 1/1632 361/679.41 |
| 8,864,000 B2* | 10/2014 | Meyer | ............ | F16M 13/022 224/275 |

(Continued)

FOREIGN PATENT DOCUMENTS

CN 107444651 A 12/2017
WO 2018035544 A2 2/2018

*Primary Examiner* — Xanthia C Cunningham
(74) *Attorney, Agent, or Firm* — Perkins Coie LLP

(57) ABSTRACT

The present disclosure relates to a monitor assembly for IFE systems. The monitor assembly comprises a screen assembly, a frame element that surrounds a perimeter of the screen or substantial portions thereof, and a cradle that is positioned behind the screen and at least partially encapsulates the frame element. The frame element is preferably made of a material that breaks more easily than the cradle material such that, upon an impact, the frame will break apart to absorb kinetic energy, while the cradle will remain intact and contain the broken frame pieces.

20 Claims, 15 Drawing Sheets

(56) References Cited

U.S. PATENT DOCUMENTS

| | | | | |
|---|---|---|---|---|
| 9,663,041 | B2* | 5/2017 | Dueser | B60R 11/0235 |
| 9,669,932 | B2* | 6/2017 | Murata | B60R 11/0229 |
| 9,695,972 | B1* | 7/2017 | Jiang | H05K 5/0017 |
| 10,315,766 | B2* | 6/2019 | Yokota | B60R 11/0235 |
| 10,342,150 | B1* | 7/2019 | Davis | H01F 7/0252 |
| 10,421,545 | B2* | 9/2019 | Hess | B64D 11/00152 |
| 10,556,549 | B2* | 2/2020 | Chang | B60R 11/02 |
| 10,588,225 | B2* | 3/2020 | Lin | H04M 1/0202 |
| 10,632,931 | B2* | 4/2020 | Tyrer | B60R 11/02 |
| 10,747,265 | B2* | 8/2020 | Galipeau | F16M 13/02 |
| 10,754,376 | B1* | 8/2020 | Williams | G06F 3/0412 |
| 2004/0032543 | A1* | 2/2004 | Chang | H04N 5/64 |
| | | | | 348/837 |
| 2005/0140845 | A1 | 6/2005 | Huang | |
| 2009/0174847 | A1* | 7/2009 | Kuno | B60N 2/838 |
| | | | | 349/96 |
| 2010/0007805 | A1* | 1/2010 | Vitito | B60K 37/06 |
| | | | | 348/837 |
| 2011/0267759 | A1* | 11/2011 | Abram | B60R 11/0235 |
| | | | | 361/679.27 |
| 2012/0068832 | A1* | 3/2012 | Feldstein | G06F 1/1626 |
| | | | | 340/12.5 |
| 2012/0206867 | A1* | 8/2012 | Pence | F16M 13/00 |
| | | | | 361/679.01 |
| 2012/0248833 | A1* | 10/2012 | Hontz | B64D 11/06 |
| | | | | 297/188.05 |
| 2013/0242523 | A1* | 9/2013 | Wallace | B64D 11/00153 |
| | | | | 361/807 |
| 2015/0336673 | A1* | 11/2015 | Hommel | B64D 11/0624 |
| | | | | 297/217.3 |
| 2016/0297526 | A1* | 10/2016 | Everhart | H05K 5/0017 |
| 2018/0345873 | A1* | 12/2018 | Campbell | F16B 39/24 |

* cited by examiner

IN-FLIGHT ENTERTAINMENT SYSTEMS AND MONITOR ASSEMBLIES FOR IN-FLIGHT ENTERTAINMENT SYSTEMS

BACKGROUND

Technical Field

This disclosure generally relates to housings for commercial avionics video seat back and in-arm monitors, and monitor assemblies for In-Flight Entertainment (IFE) systems.

Related Art

Many vehicles of common carriers, such as airplanes, passenger trains, buses, cruise ships, and the like, have individualized functional equipment dedicated to a particular passenger seat which can be utilized by the passenger, such as video and/or audio entertainment systems, adjustable seats, adjustable environmental controls, adjustable lighting, telephony systems, crew communication systems, and the like. For example, many commercial airplanes have individualized video and audio entertainment systems, often referred to as "in-flight entertainment" or "IFE" systems. Many IFE systems include communication capabilities and are frequently referred to as "in-flight entertainment and communication" or "IFEC" systems. IFE system as used herein includes IFEC systems.

As one example of a passenger seat function, the entertainment systems (e.g., an IFE system) for passenger carrier vehicles, such as commercial airlines, often include in-seat video display units installed at each passenger seat. For instance, video display units may be mounted at each of the seatbacks of the passenger seats and also at bulkheads and in arm rests of seats. The entertainment system typically includes a centralized entertainment system server which is networked to each of the video display units via a communication network. The entertainment system server distributes media content (e.g., videos, audio, movies, television shows, etc.) to each of the video display units. Generally, the entertainment system allows each passenger to select from multiple video channels and/or audio channels, and/or individually select and play videos and/or audio from a library of videos and audio content. The video displays may also provide games, communication applications (e.g., telephone service, messaging, etc.), internet browsing, purchasing capabilities, and other computer applications. In some systems, the video displays may be smart monitors which can run computer applications and process and store data internally.

Some of the drawbacks of known IFE offerings relate to safety and Head Injury Criterion (HIC) testing. Other drawbacks relate to the difficulty in assembling, disassembling and servicing components of the IFE offerings (e.g., screen components).

In an attempt to overcome some of the drawbacks of IFE systems, International Patent Publication No. WO 2018/035544 to Rockwell Collins Inc. teaches a frame system having plastic ridges in specific locations of a front frame to distribute impact loads. This and other publications referenced herein are incorporated by reference in their entireties. Rockwell Collins' frame system, includes front and rear frames that detachably couple to one another so that an electronic device can be enclosed between the components. An opening on the front frame defines a boundary of a visible screen region of the electronic device, and a screen protector and bezel are placed between the electronic device and the front frame.

As such, there is continuing need for improved IFE systems and devices for housing IFE displays that provide any number of improved features, for example, in the areas of safety, aesthetic design, functionality, and the like.

The present disclosure is directed toward one or more improved features identified below, and to devices providing increased functionality over prior devices and systems.

SUMMARY

Monitor assemblies for In-Flight Entertainment (IFE) systems are disclosed herein. Each monitor assembly comprises a screen assembly, a frame element, and a cradle. The screen assembly includes a front face, a rear face, and a side surface or perimeter surface that extends between the front and rear faces. The frame element includes a side surface extending between a front portion and a rear portion of the frame element, and is positioned around at least a portion of the side surface of the screen assembly. The cradle includes a rear portion and a frame element covering portion. In some preferred embodiments, the cradle substantially encapsulates the frame element, and the frame element covering portion can be positioned over at least 70%, at least 80%, at least 90% or even all of an outer surface of the side surface of the frame element.

The side surface portion of the frame element, and in some embodiments the entire frame element, is preferably made of a plastic material. In contrast the cradle is preferably made of a more durable metal material such as a metal or metal alloy having a suitable thickness as to not break during HIC testing. Some preferred cradle materials comprise aluminum, magnesium, and/or zinc. The frame element may be bonded to the side surface of a screen assembly via an adhesive or other suitable bonding agent. The screen assembly may include one or more screen displays, touch panels, LCDs, capacitive or physical buttons, a camera, and a front frame or cover lens including openings to allow user access to such components. The metal cradle and plastic frame element combination provides a more robust IFE monitor housing that performs well during HIC testing due to the strong structure of the cradle, which is able to act as an energy absorbing device without breaking or becoming a safety hazard. This is especially true in the critical peripheral area, which often breaks during HIC testing and creates sharp edges and allows glass to escape that could cause additional injury. The stiffness of the cradle reduces the deflection of the screen glass, and helps to prevent it from breaking during HIC testing. The frame element, which can be positioned to surround a perimeter of a screen assembly it is bonded to, absorbs kinetic energy upon impact by deflecting and breaking. The cradle extends over and encapsulates some or all of the frame element, for example at least 30%, at least 40%, at least 50%, at least 60%, at least 70%, at least 80%, or at least 90% of the frame element, and can stay intact upon impact and house any sharp edges created during the breaking of the frame element.

A rear cover may be coupled to the rear portion of the cradle (e.g., via screws), and a microprocessor printed circuit board (PCB) can be partially or fully enclosed between the rear cover and the cradle. The rear cover and cradle can advantageously create a faraday cage type design, which limits the EMI (Electromagnetic Interference) of electronics contained within. The enlarged metal surface of the cradle and/or rear cover allows for a better thermal dissipation compared to traditional plastic enclosures. The mechanical design allows for the cradle and/or rear cover to be machined or cast with minor adjustments. The proposed cradle and/or rear cover design therefore does not require cooling holes or ports as required in traditional designs for ventilation.

Other advantages and benefits of the disclosed system and methods will be apparent to one of ordinary skill with a review of the following description.

BRIEF DESCRIPTION OF THE DRAWINGS

The details of embodiments of the present disclosure, both as to their structure and operation, can be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Some of the surfaces have been left out or exaggerated for clarity and ease of explanation.

The present disclosure is directed to monitor assemblies for IFE systems with an improved design, fewer components, and greater performance during HIC testing than known assemblies. The assemblies are safe for passengers of vehicles of common carriers, even upon impact during turbulence of other incident, and are designed to be easily assembled, disassembled, updated and maintained.

Although the embodiments described herein may be used in an IFE system by mounting the monitor assembly at a passenger seat, the monitor assembly is not limited to such installations, but can be utilized in any suitable application, such as in schools, libraries, public spaces, etc., where it is useful to be able to provide entertainment or computing capabilities to passengers. As used herein, the term "IFE system" should be interpreted broadly to include entertainment systems for any vehicle.

Reference throughout this specification to "an embodiment" or "an implementation" means that a particular feature, structure, or characteristic described in connection with the embodiment is included in at least one embodiment or implementation. Thus, appearances of the phrases "in an embodiment" in various places throughout this specification are not necessarily all referring to the same embodiment or a single exclusive embodiment. Furthermore, the particular features, structures, or characteristics described herein may be combined in any suitable manner in one or more embodiments or one or more implementations.

Figure 1A:
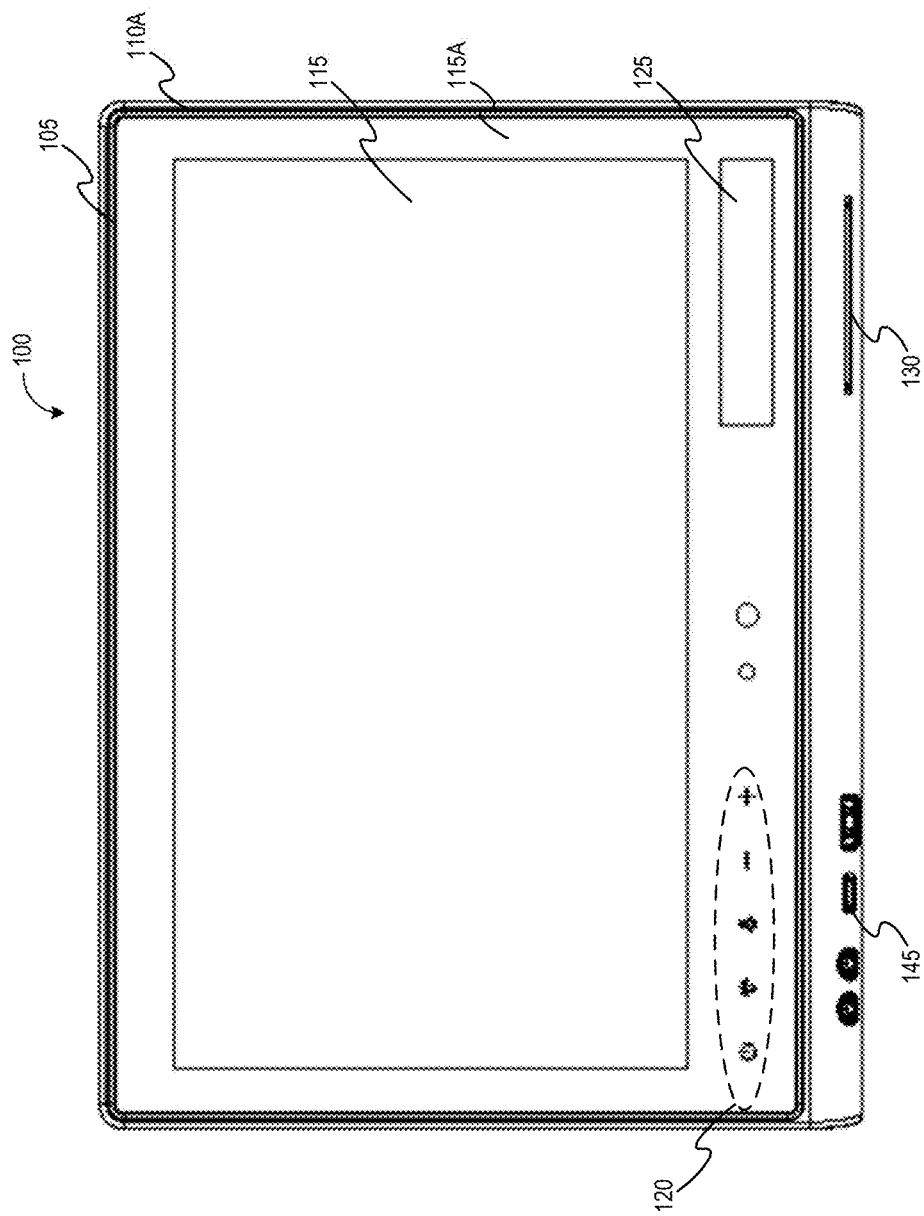
FIG. 1A is a front view of a monitor assembly for an In-Flight Entertainment (IFE) system that includes a screen assembly, a frame element, and a cradle, according to an embodiment.
Figure 1B:
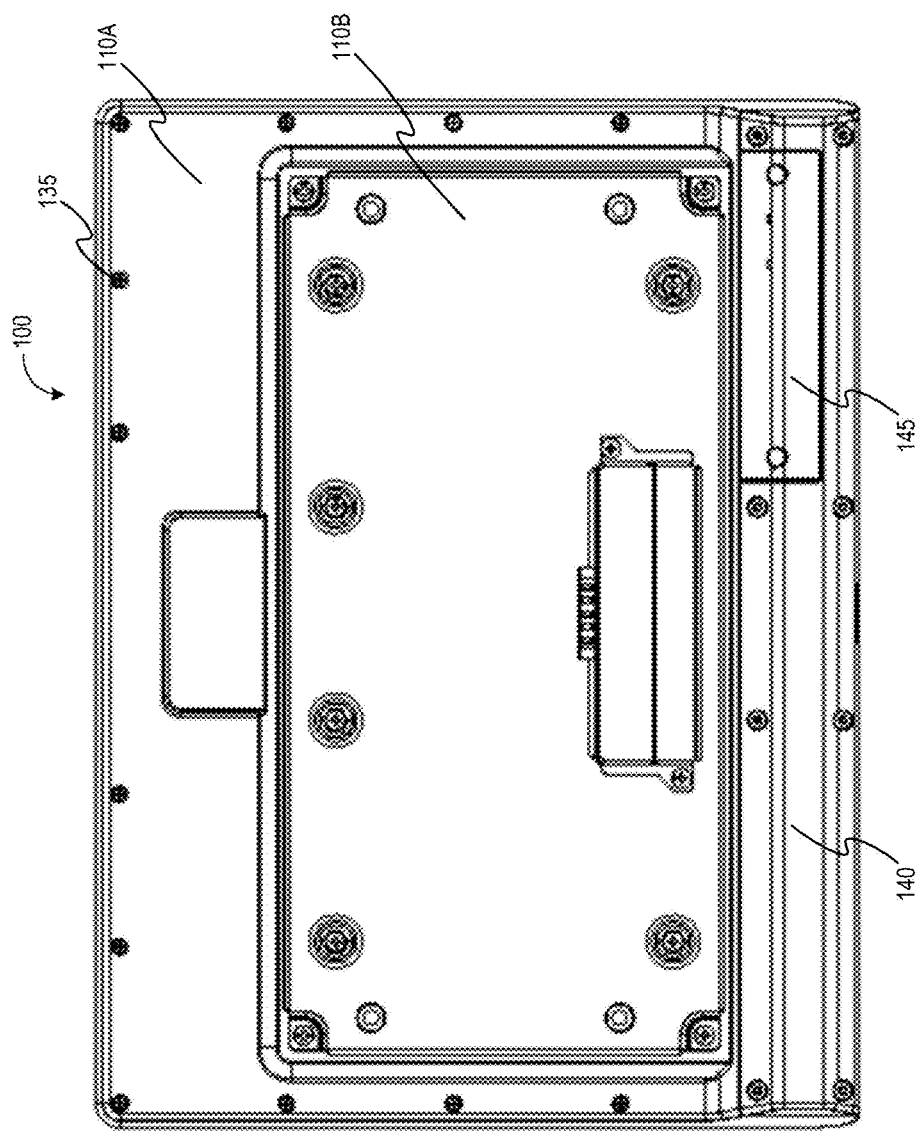
FIG. 1B is a rear view of the monitor assembly for an IFE system of FIG. 1A.
Figure 1C:
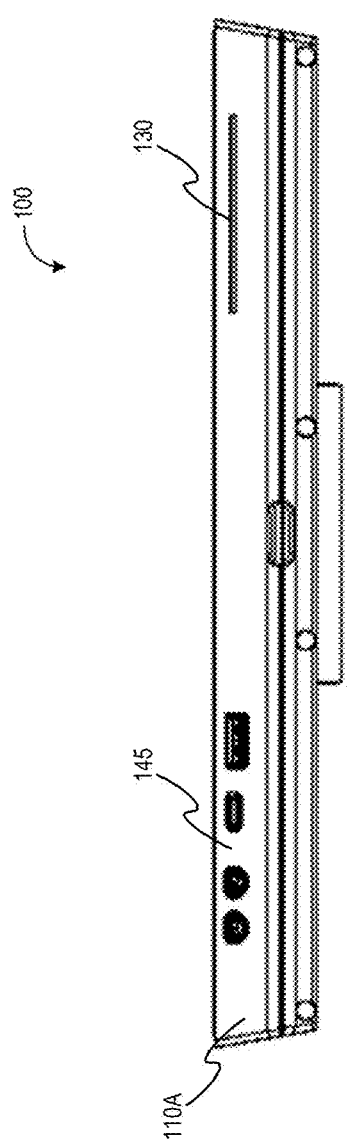
FIG. 1C is a bottom view of the monitor assembly for an IFE system of FIG. 1A.
Figure 1D:
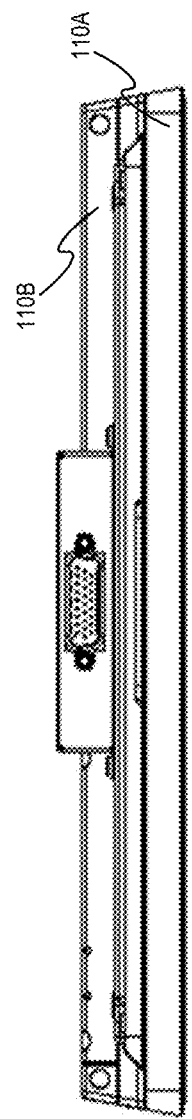
FIG. 1D is a top view of the monitor assembly for an IFE system of FIG. 1A.
Figures 1E, 1F:
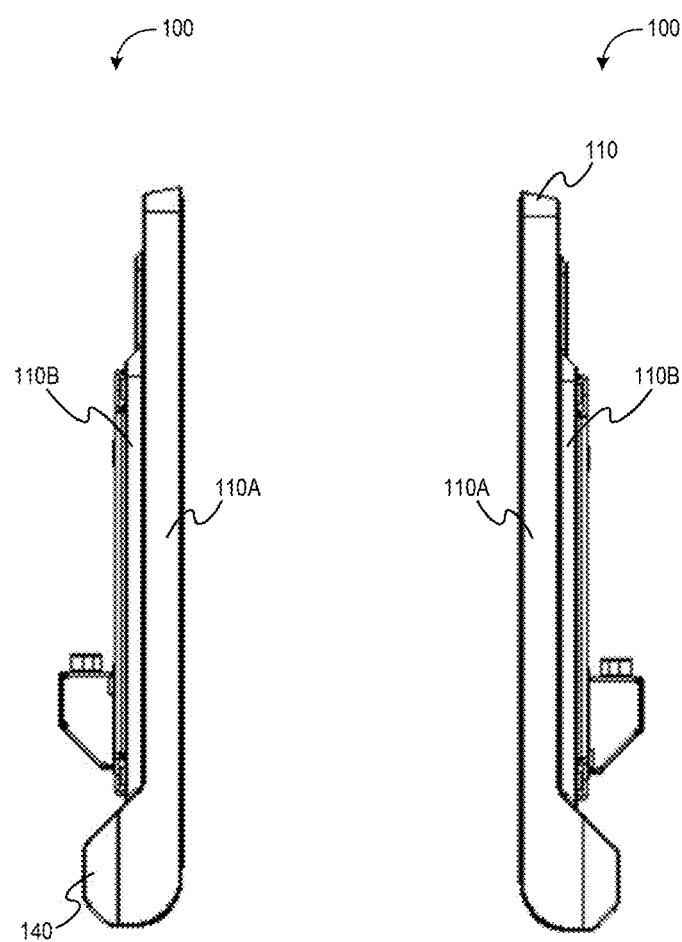
FIG. 1E is a right side view of the monitor assembly for an IFE system of FIG. 1A.
FIG. 1F is a left side view of the monitor assembly for an IFE system of FIG. 1A.
Figure 1G:
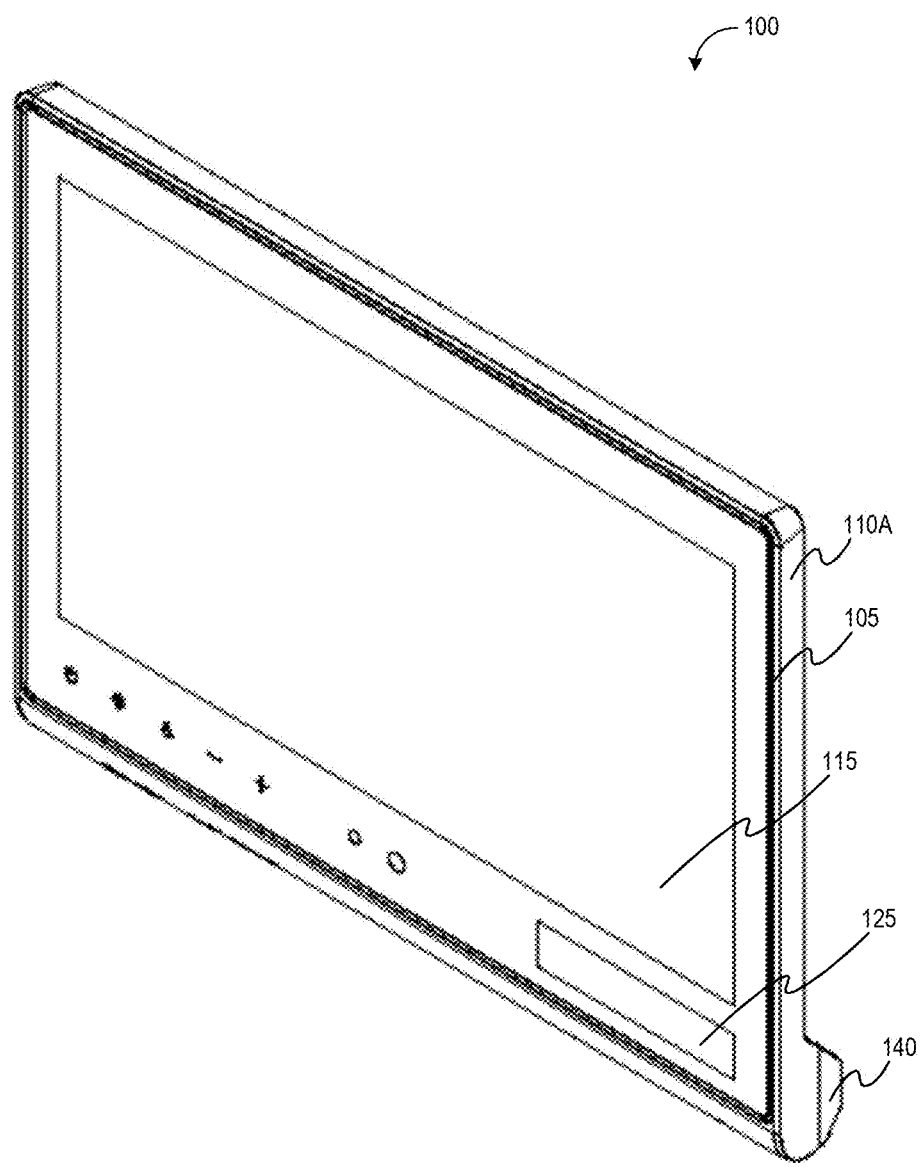
FIG. 1G is a front, perspective view of the monitor assembly for an IFE system of FIG. 1A.
Figure 1H:
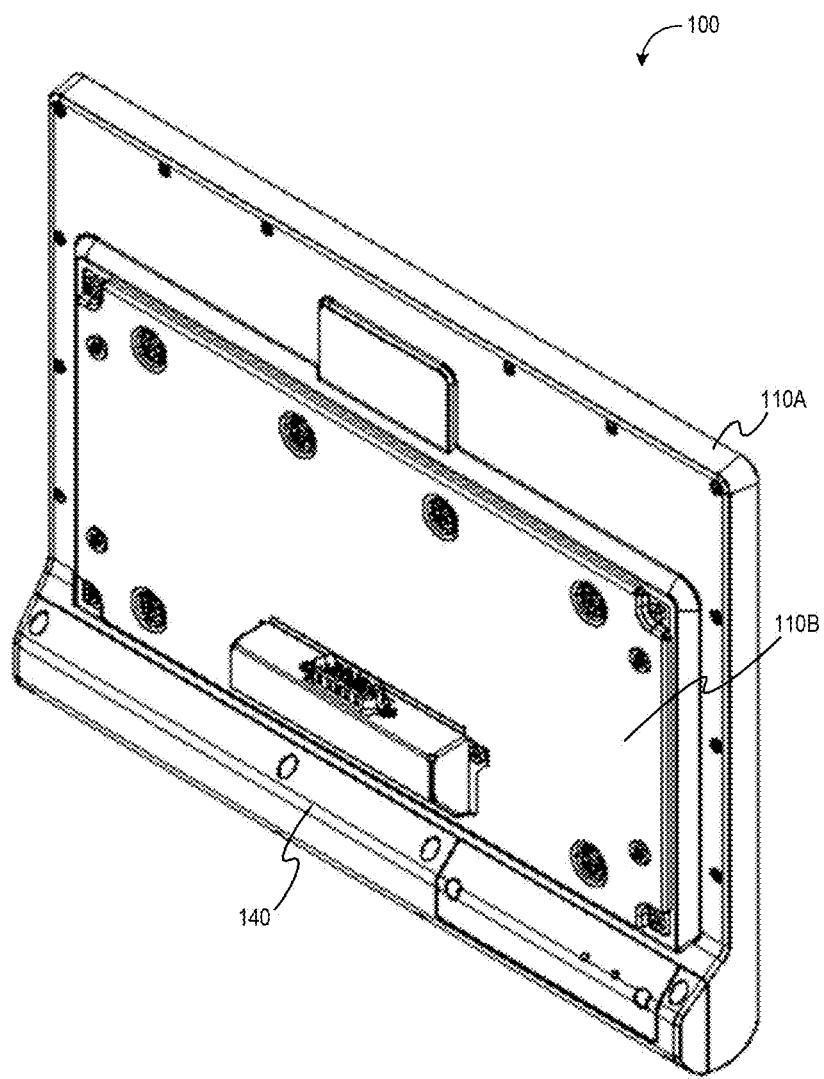
FIG. 1H is a rear, perspective view of the monitor assembly for an IFE system of FIG. 1A.

Referring now to FIGS. 1A-1H, an embodiment of a monitor assembly 100 of an IFE system is illustrated. FIG. 1A is a front view of monitor assembly 100, FIG. 1B is a rear view of the monitor assembly, FIG. 1C is a bottom view of the monitor assembly, FIG. 1D is a top view of the monitor assembly, FIG. 1E is a right side view of the monitor assembly, FIG. 1F is a left side view of the monitor assembly, FIG. 1G is a front, perspective view of the monitor assembly, and FIG. 1H is a rear, perspective view of the monitor assembly.

Monitor assembly 100 comprises a plastic frame element 105 bonded to a side surface of a screen assembly 115. As used herein, a "side surface" of a screen assembly is the surface extending between the front face and a rear face of the screen assembly. The front face of the screen assembly is what a passenger sees when using the monitor assembly, and a rear face of the screen assembly is the surface that faces a cradle of the monitor assembly.

Plastic frame element 105 includes a side surface that extends between a front portion of the frame element and the rear portion of the frame element. In some embodiments, the front and rear portions could comprises parallel edges. In some contemplated embodiments, the rear portion can be positioned over a portion of the rear face of the screen assembly. In some contemplated embodiments, the front portion can be positioned over a portion of the front face of the screen assembly.

A metal/metal alloy cradle 110A, which forms the main structure of the monitor assembly or holder, is removably coupled to frame element 105 via a set of screws 135 and/or clips and/or any other suitable fasteners. The metal construction of cradle 110A improves the structural, thermal, EMI and cosmetic characteristics of the IFE monitor assembly 110. This type of design aids to increase the stiffness of the product, reduce the weight by decreasing the amount of assembly parts, and provides a large thermal mass for heatsinking the electronic components.

Advantageously, the metal construction of cradle 110A further protects passengers from plastic frame element 105, which is designed to absorb kinetic energy by deflecting and breaking during an impact and create sharp pieces that are contained within cradle 110A. Further, the stiffness of cradle 110A reduces the deflection of the front glass and helps to prevent it from breaking during HIC testing. In some contemplated embodiments, cradle 110A can remain intact without any cracks or breaks through an impact that causes the plastic frame element 105 to break. In some contemplated embodiments, cradle 110A can be cracked and/or broken during such an impact, but not to an extent that hazardous sharp edges are formed on cradle 110A.

A rear cover 110B may be provided, and a microprocessor PCB may be housed between cradle 110A and rear cover 110B. The rear cover 110B can also be made of a metal/metal alloy, and provide a means for fully enclosing the microprocessor PCB and creating a faraday cage type design, which limits the electromagnetic interference. Some preferred materials for cradle 110A and/or rear cover 110B include lightweight metal alloys and/or casted materials such as those including aluminum, magnesium, and/or zinc. However, it is contemplated that cradle 110A and rear cover 110B can be made from any other suitable material(s), including any metals, metal alloys, and/or non-metals.

Another advantageous feature of the cradle of some embodiments is that cooling or ventilation holes are not required as in traditional monitor assembly designs. The enlarged aluminum (and/or other metal or metal alloy) surface allows for a better thermal dissipation compared to traditional all or mostly plastic enclosures. From an aesthetics perspective, the mechanical design of the cradle allows it to be machined or casted with minor adjustments, and does not require the two bulky cosmetic halves coupled via visible joints as seen in traditional device holders.

The frame element 105 can serve as an interface for coupling cradle 110A to screen assembly 115, which comprises a touch panel optically bonded to a LCD module. Screen assembly 115 may include a front frame portion or cover lens 115A that includes apertures and provides a framing for accessories such as capacitive buttons on screen assembly 115. Frame element 105 may be ring shaped (which can be round, rectangular, a rounded rectangle, etc.) and attach to screen assembly 115 via an adhesive while attaching to cradle 110A via screws or integrated plastic clips. Additionally or alternatively, frame element 105 can have any suitable shape that covers portions of the front face, rear face, and/or side surface of screen assembly 115. In some preferred aspects, frame element 105 and the bonded screen assembly 115 can easily be disassembled from cradle 110A for service and/or replacement of the LCD module, touch panel, or other accessories.

Although the disclosure herein is generally directed to frame elements directly bonded to screens via adhesives, it should be appreciated that some contemplated frame elements can indirectly be coupled or attached to screens via any suitable couplers or bonding agents. In some contemplated embodiments, the screen may be removably coupled to the frame element and not bonded via an adhesive.

As most clearly shown in FIG. 1A, the screen assembly 115 includes a first screen display, capacitive user control button interface 120 (e.g., on/off button for screen, light button, call attendant button, and volume control buttons), which are accessible via a set of openings of the front frame or cover lens of screen assembly 115, The openings may optionally have light diffusers or a protective element positioned. In some embodiments, physical buttons may be provided in addition to, or alternatively to, capacitive buttons. The front frame or cover lens of screen assembly 115 may also comprise one or more openings that allow a passenger to access a second screen display 125 of screen assembly 115.

As most clearly shown in FIG. 1B, rear cover 110B is removably coupled to a rear portion of cradle 110A, and a PCB is housed between the two components. The rear cover and cradle can advantageously be formed by a continuous covering of conductive material (e.g., aluminum, aluminum alloys) and create a faraday cage or faraday shield type design, which limits the EMI of electronics contained therein. The enlarged metal surface of the cradle and/or rear cover can also allow for better thermal dissipation compared to traditional plastic enclosures.

Cradle 110A comprises an integrated USB and Audio jack module 145 (also shown in FIGS. 1B and 1C), and an integrated credit card reader payment module 130 that is housed at least partially between cradle 110A and a lower second screen cover 140, and beneath screen assembly 115. These and other components (e.g., LCD module) are seamlessly integrated into monitor assembly 100 while allowing it to be serviceable. A mounting is provided for installation of monitor assembly 100 to the seat back or other portion of a plane or other vehicle so that passengers can enjoy audiovisual entertainment of their choice at a desired volume, and purchase content, food and beverages from the comfort of their seat.

Figure 2A:
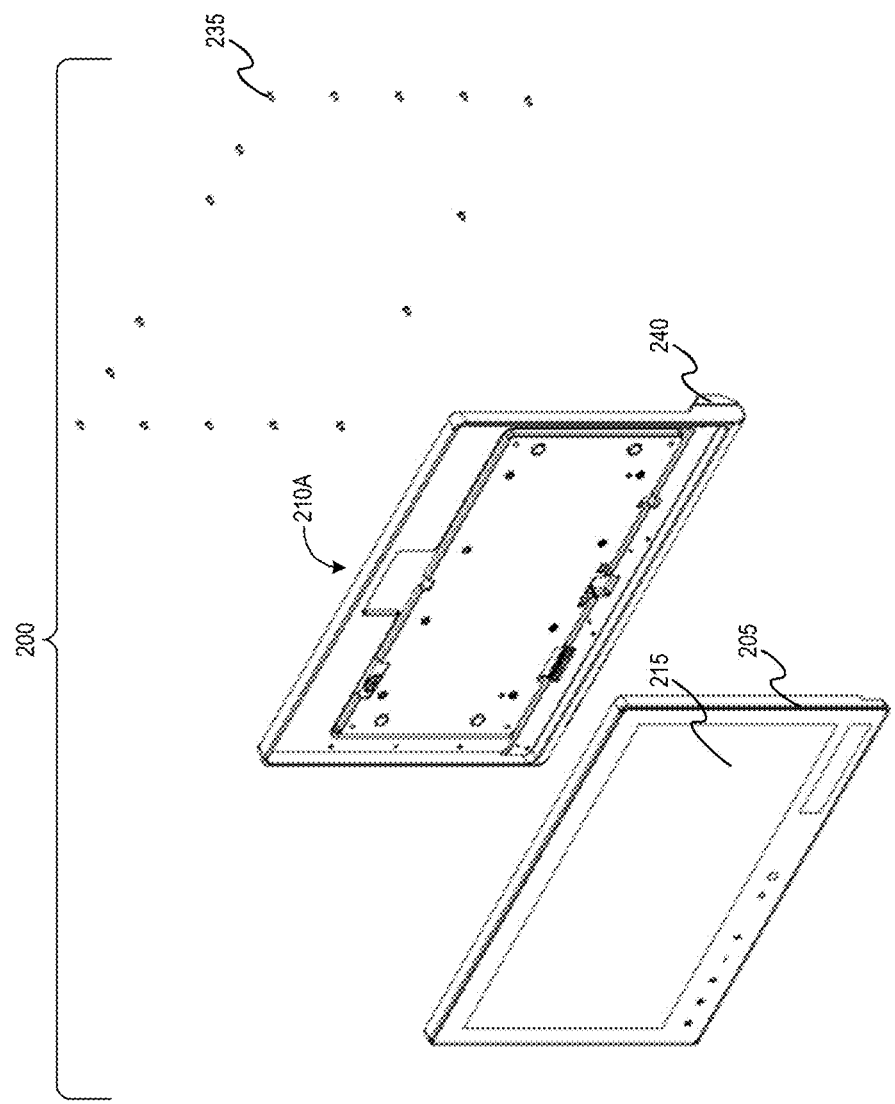
FIG. 2A is a front, perspective, partial exploded view of a monitor assembly for an IFE system, according to an embodiment.
Figure 2B:
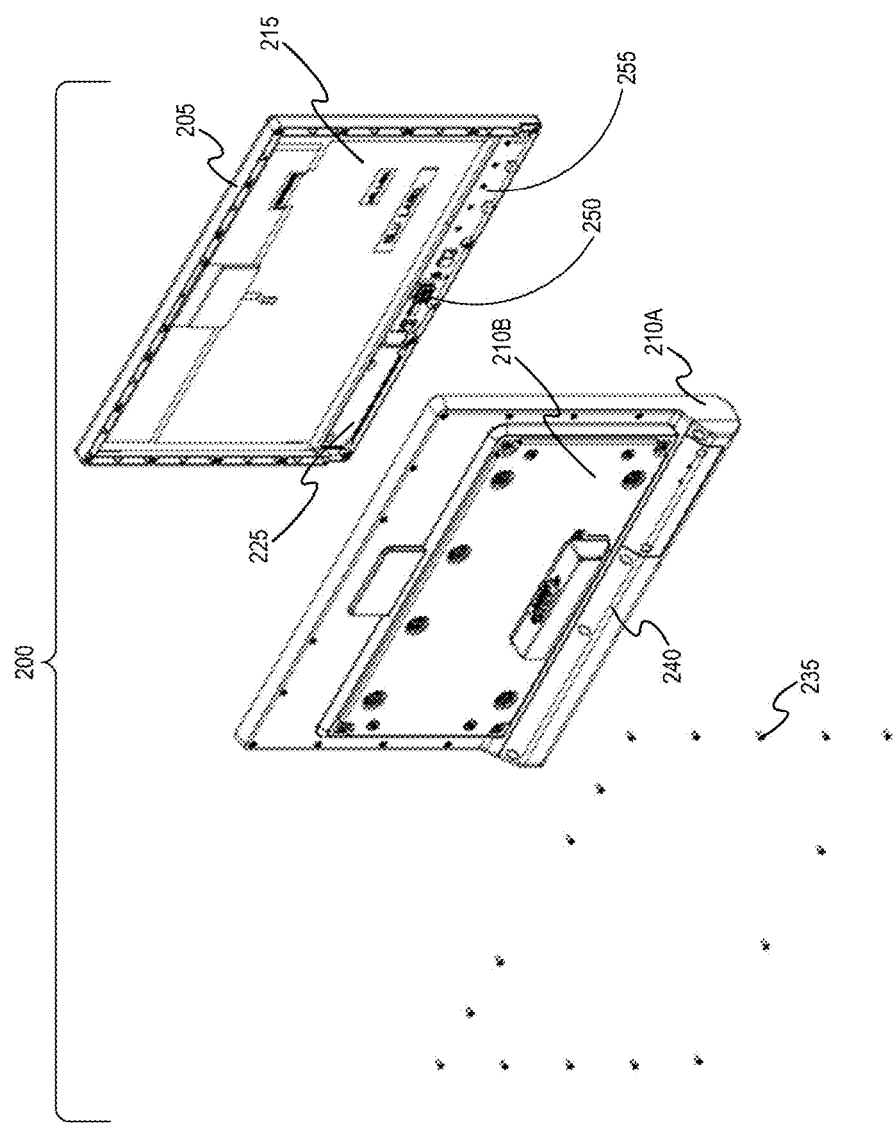
FIG. 2B is a rear, perspective, partial exploded view of the monitor assembly for an IFE system of FIG. 2A.

Referring to FIGS. 2A-2B, another embodiment of a monitor assembly 200 of an IFE system is illustrated. FIG. 2A is a front, perspective, partial exploded view of monitor assembly 200, and FIG. 2B is a rear, perspective, partial exploded view of monitor assembly 200.

Monitor assembly 200 comprises a core ring assembly, which comprises frame element 205 and screen assembly 215. Screen assembly 215 is bonded to frame element 205, and additional components can be mounted in the core ring assembly. In the embodiment illustrated, the core ring assembly includes or is coupled to camera 250, a Bluetooth Antenna, an accessory PCB 255 that provides functionality such as Bluetooth, capacitive touch buttons, and ambient light sensors, and additional screen displays (e.g., a second screen display with second LCD 225). The frame element 205 extends only over a perimeter or side edges of the screen assembly 215. The core ring assembly, specifically frame element 205, provides electrical insulation between the metal cradle 210A and the components, and is configured to absorb kinetic energy by breaking within cradle 210A, which contains any sharp edges caused by the breaking such that passengers are not exposed to them.

Cradle 210A is configured to at least partially encapsulate frame element 205 and/or the core ring assembly (frame element 205 and screen assembly 215), and can advantageously be constructed from a lightweight metal alloy and machined from billet or cast. In some aspects, Cradle 210A can be made from a single piece of metal, and have a high stiffness that helps to limit the deflection of the monitor during an impact and reduce the likelihood of glass breakage. One or more cushions or pads (e.g., foam cushion, rubber cushion) can be attached to an inner surface of cradle 210A facing screen assembly 215 (and/or to screen 215), and act as shock absorbers. One or more cushions or pads can also be attached to an inner surface of cradle 210A and/or the accessory components (accessory PCB, camera, second LCD, etc.) to absorb shock and protect the accessory components when a force is applied to monitor assembly 200 (e.g., during an impact). Cradle 210A includes a set or openings that allow (a) user access to certain accessory components such as the credit card reader module and audio jack, and/or (b) receive flexible printed circuits (FPCs) and flexible flat cables (FFCs) that connect to the main PCB positioned between cradle 210A and rear cover 210B, and components such as cameras, screens, and accessory PCBs positioned on the opposite side of cradle 210A.

Rear cover 210B and a second cover 240 are removably coupled to the outer surface of the rear portion of Cradle 210A, which faces away from screen 215. The main PCB is housed between rear cover 210B and the rear portion of Cradle 210A.

Figure 3A:
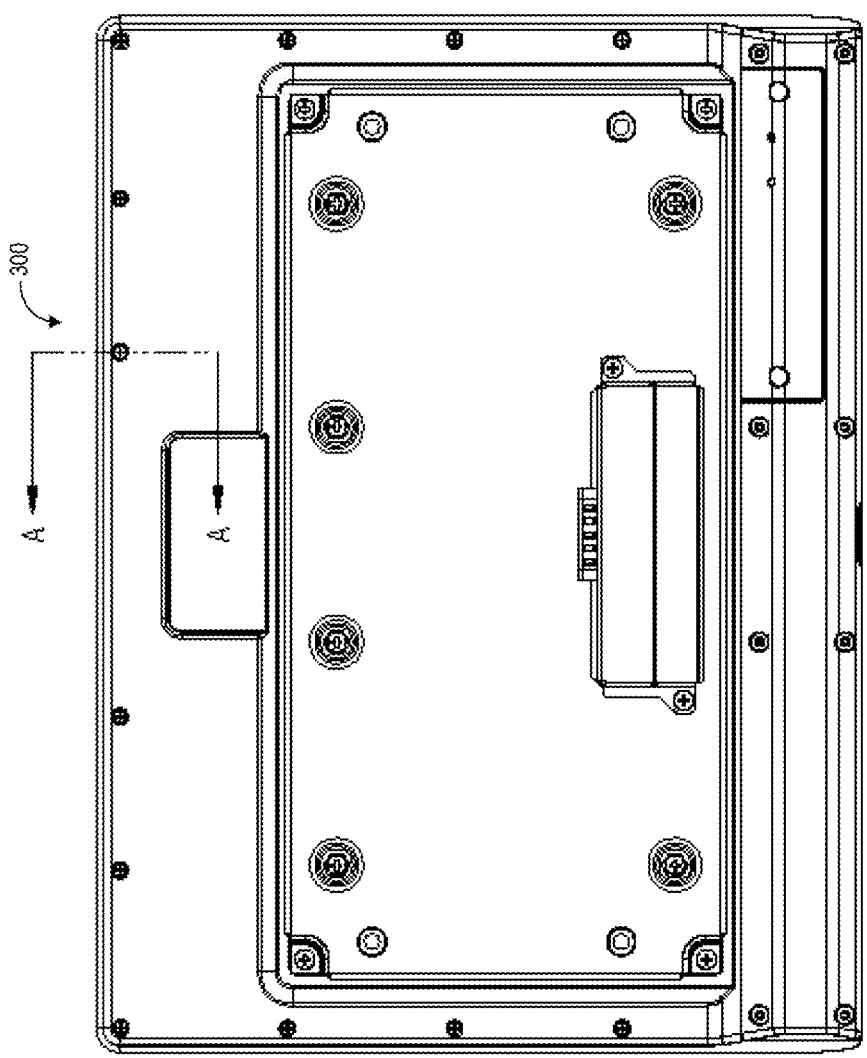
FIG. 3A is a rear view of a monitor assembly for an IFE system, according to an embodiment.
Figure 3B:
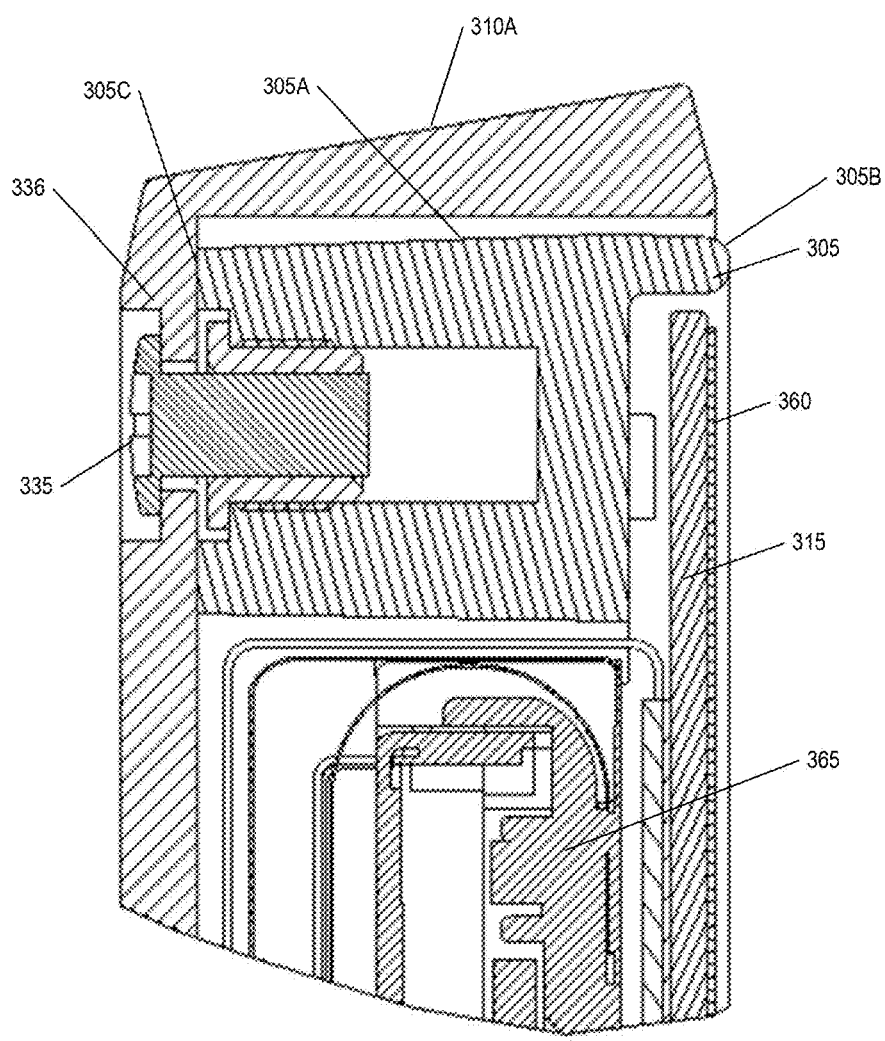
FIG. 3B is a partial, cross-sectional view of the monitor assembly for an IFE system of FIG. 3A.

Referring to FIG. 3A, a rear view of an embodiment of a monitor assembly 300 is illustrated. FIG. 3B is a partial, cross-sectional view of monitor assembly 300 along Section A-A., which illustrates another advantageous feature of monitor assemblies of the inventive subject matter.

Monitor assembly 300 comprises screen assembly 315, including touch panel 360 and LCD 365. Frame element 305 is coupled to screen assembly 315, and frame element 305 includes a side surface 305A that extends between front portion 305B and rear portion 305C. Side surface 305A of frame element 305 is entirely or almost entirely encapsulated (at least 90% encapsulated) by a side surface of cradle 310A. Where frame element 305 includes a side surface 305A that is positioned around a side surface of screen assembly 315, and where front portion 305B is a front face portion that covers a portion of the front face of screen assembly 315, it is contemplated that cradle 310A can cover at least 50%, at least 60%, at least 70%, at least 80%, at least 90% or even more of an outer surface of the side surface portion while covering no part, some part, or the entire part of the front face portion. In some contemplated embodiments, side surface 305A of frame element 305 can be positioned entirely behind touch panel 360 such that it does not protrude beyond touch panel 360. The side surface 305A of frame element 305A can be entirely encapsulated by cradle 310A.

As shown in FIG. 3B, Cradle 310A includes one or more thinned portion or recessed portion that acts as a screw interface fuse 336. For example, a cradle may include at least 2, at least 4, at least 6, at least 8 or even more screw interfaces fuses. Screw 335 can be seated in the thinned and recessed portion in a manner that screw 335 does not extend out of the recessed portion. The thinned wall of the recessed portion is configured to break more easily than other portions of cradle 310A during an impact and absorb kinetic energy, reducing the likelihood of glass breakage.

Figure 4A:
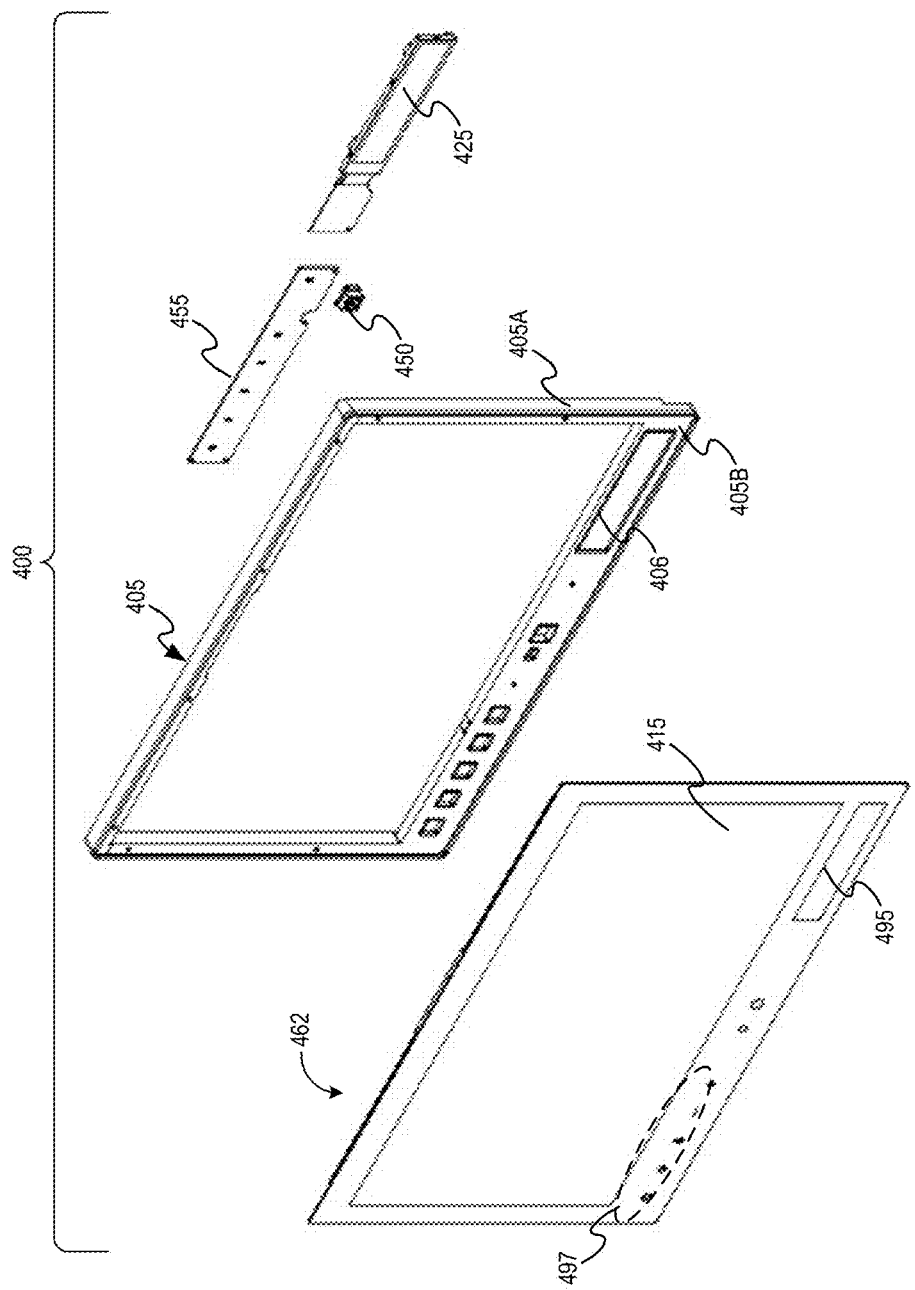
FIG. 4A is a front, perspective, partial exploded view of a frame element, screen, and accessory components of a monitor assembly for an IFE system, according to an embodiment.
Figure 4B:
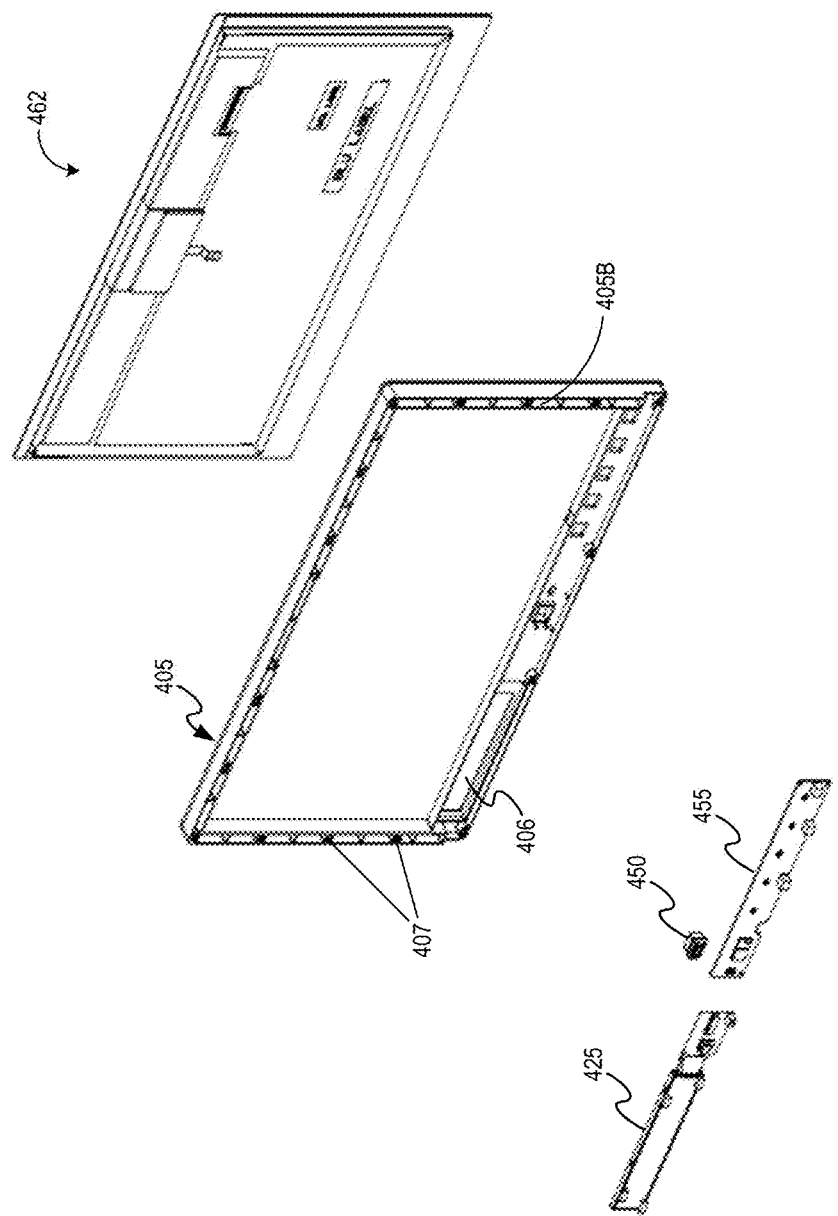
FIG. 4B is a rear, perspective, partial exploded view of a frame element, screen, and accessory components of the monitor assembly for an IFE system of FIG. 4A.

Referring to FIGS. 4A-4B, another embodiment of a monitor assembly 400 of an IFE system is illustrated. FIG. 4A is a front, perspective, partial exploded view of a frame element 405, screen assembly 415, and accessory components of a monitor assembly 400 for an IFE system. FIG. 4B is a rear, perspective, partial exploded view of the frame element 405, screen assembly 415, and accessory components of the monitor assembly 400.

Monitor assembly 400 includes a first screen assembly 415, which includes a touch panel and LCD combination 462, a second screen display 495, and capacitive user button controls 497. Frame 405 is made of a plastic material, and includes not only a continuous side surface 405A that surrounds a perimeter of screen 415, but also a front face 405B that includes apertures (e.g., 406) that allows a user to see and access user button controls 497 and second screen 495. A rear portion 405C of frame element 405 includes a set of screw receivers 407 that are sized and dimensioned to receive a set of screws that couple a cradle to frame element 405. A second LCD 425, a camera 450, and accessory PCB 455 are also coupled to the plastic frame element 405. The camera 450 and second LCD 425 are each accessible via openings in a front portion of plastic frame element 405.

Figure 5A:
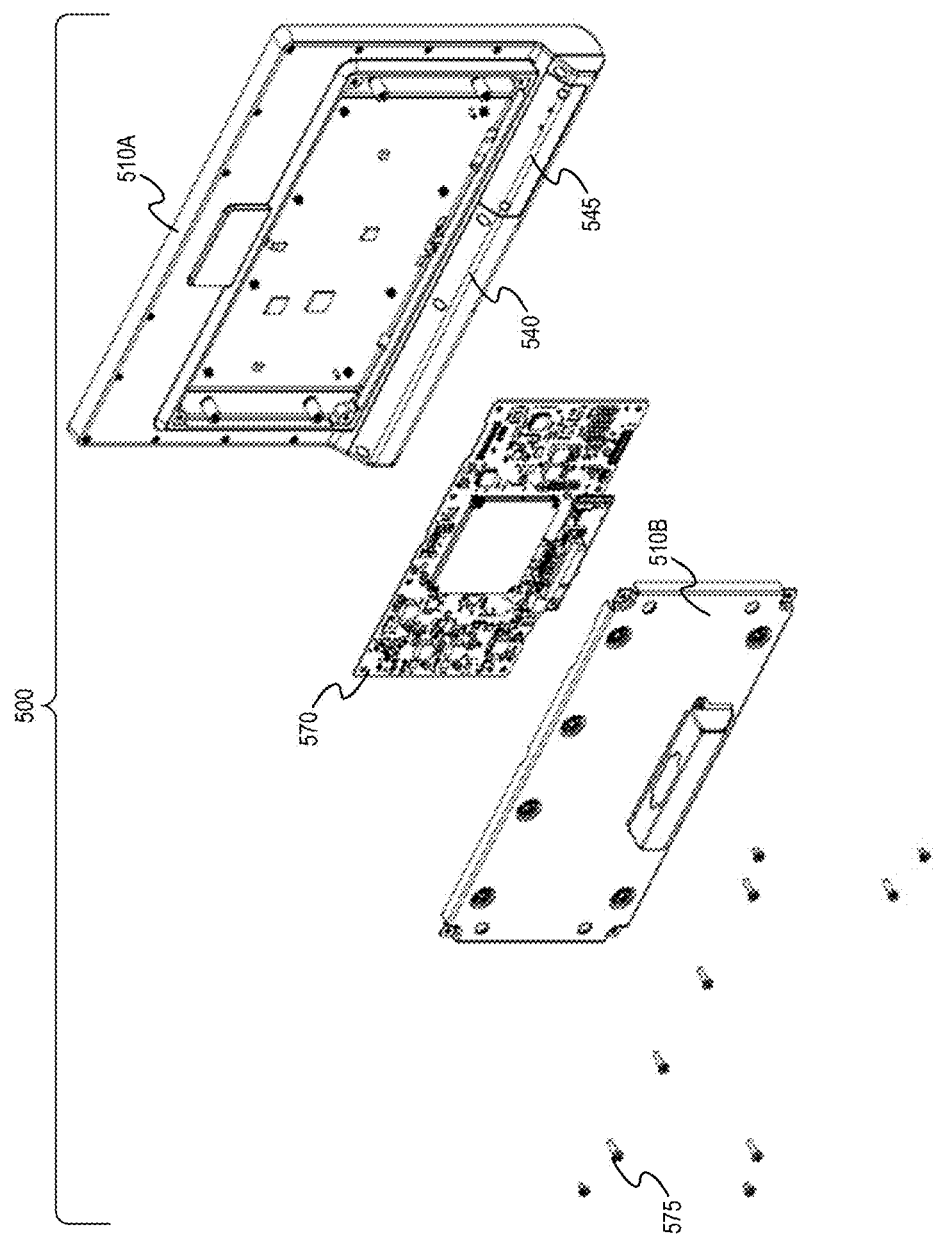
FIG. 5A is a rear, perspective, partial exploded view of a cradle and rear cover of a monitor assembly for an IFE system, according to an embodiment.
Figure 5B:
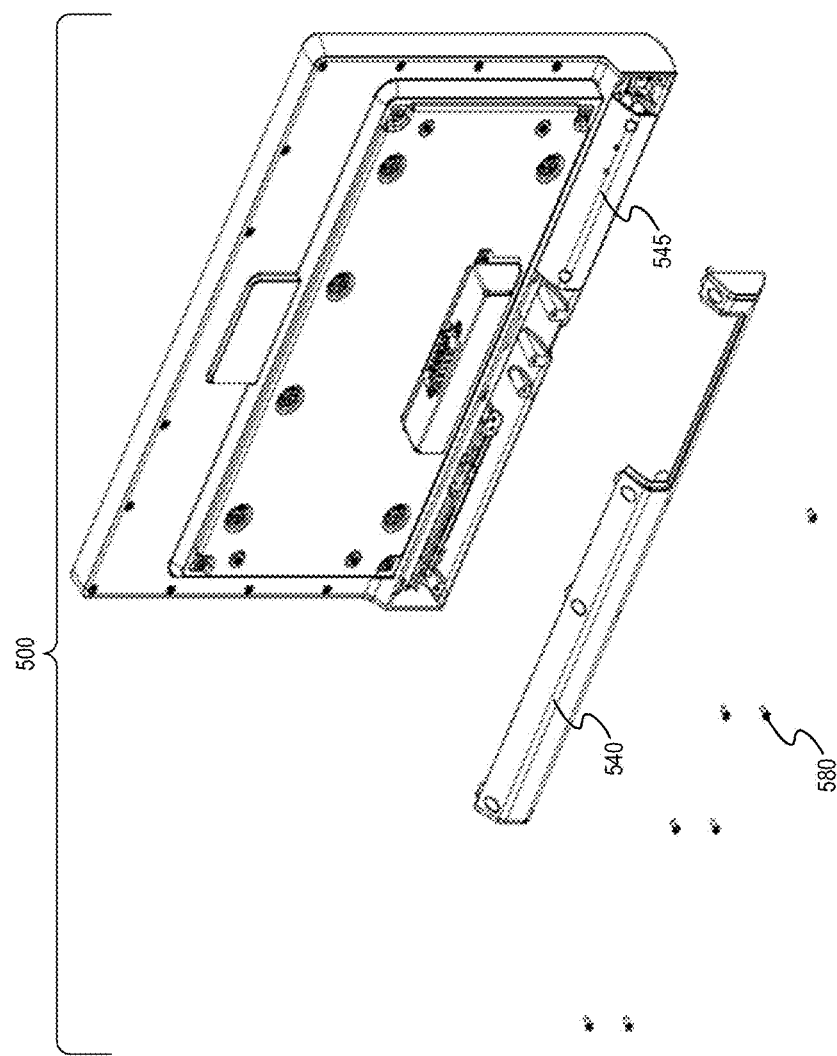
FIG. 5B is another rear, perspective, partial exploded view of the cradle and rear cover of the monitor assembly for an IFE system of FIG. 5A.

Referring to FIGS. 5A-5B, another embodiment of a monitor assembly 500 of an IFE system is illustrated. FIG. 5A is a rear, perspective, partial exploded view of a cradle and rear cover of monitor assembly 500, and FIG. 5B is another rear, perspective, partial exploded view of the cradle and rear cover of monitor assembly 500.

Monitor assembly 500 includes cradle 510A, microprocessor PCB 570, rear cover 575 that is coupled to cradle 510A via screws 575 (e.g., standoff screws), a second cover 540 that is coupled to cradle 510A via second cover screws 580, and integrated USB and audio jack module 545. To preserve the structural rigidity and cosmetic appearance of Cradle 510A, the integrated USB and audio jack module 545 can be removable from the rear side of monitor assembly 500. PCB 570 electrically connects electronic and electric components of monitor assembly 500, and may be coupled to one or more heat spreaders, thermal grease (CPU grease, thermal compound, thermal gel, thermal paste), and thermal pads such that ventilation holes on the rear cover is not needed. Rear cover is preferably an aluminum or other sheet metal, and cradle 510A is preferably also a metal cradle such that a faraday cage is created around PCB 570, which limits the EMI of the electronics. The enlarged metal surface of cradle 510A can dissipate the heat from the electronics and eliminate the need for ventilation holes. The credit card reader payment module and USB and audio jack module are seamlessly integrated and mounted partially or entirely between cradle 510A and second cover 540.

Figure 6:
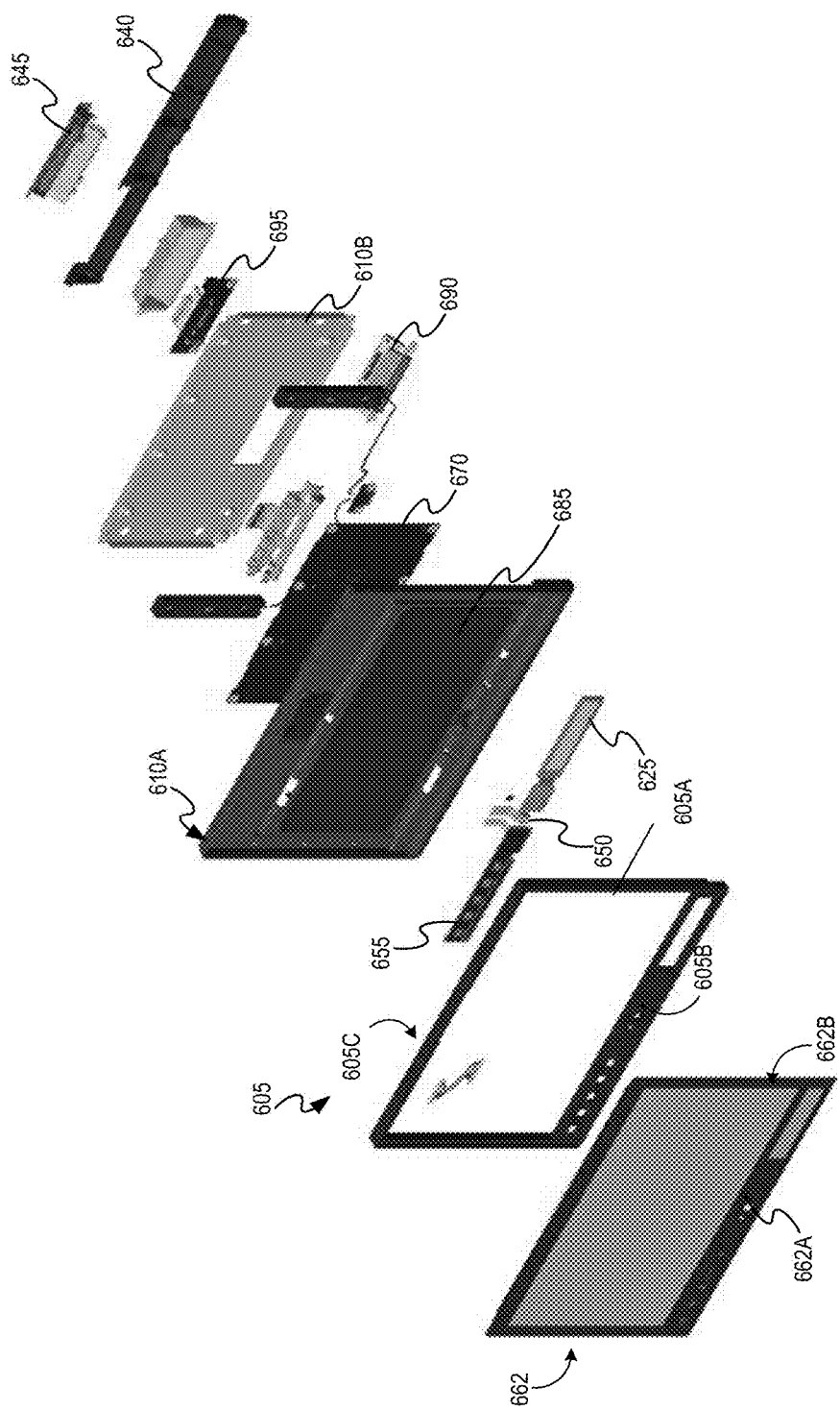
FIG. 6 is a front, perspective, exploded view of a frame element, screen, and accessory components of a monitor assembly for an IFE system, according to an embodiment.

Referring to FIG. 6, a front, perspective, exploded view of a frame element, screen, and accessory components of a monitor assembly for an IFE system according to an embodiment are illustrated.

Monitor assembly 600 comprises a screen assembly 662 with an optically bonded touch screen and LCD. Screen assembly 662 also includes a front frame or cover lens 662A that is configured to at least partially be covered by a frame element 605. Frame element 605 is configured to be attached to screen assembly 662 and includes a side surface 605A that extends between front portion 605B and rear portion 605C, and overlies the side surface 662B of screen assembly 662. Front portion 605B is a front face portion that overlies the front frame or cover lens 662A of screen assembly. A camera 650, second display 625, and accessory PCB 655 are each coupled to frame element 605. Cradle 610A comprises or is coupled to one or more cushions (e.g., cushion 685) such that the cushion 684 is disposed between the screen assembly 662 and cradle 610A when monitor assembly 600 is fully assembled. Monitor assembly 600 further comprises elements positioned behind cradle 610A, which includes a main PCB 670, a chip card reader 690, rear cover 610B, an I/O board 695, a peripheral cover 640, and an integrated USB and audio jack module 645.

Thus, various embodiments of monitor assemblies of the inventive subject matter have been disclosed herein. Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes, relative positions, and relative sizes of the components of the invention may be modified. Accordingly, embodiments are intended to exemplify alternatives, modifications, and equivalents that may fall within the scope of the claims. The invention, therefore, should not be limited, except to the following claims, and their equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

What is claimed is:

1. A monitor assembly for an In-Flight Entertainment (IFE) system, comprising:
   a screen assembly including a front face, a rear face, and a side surface that extends between the front and rear faces;
   a frame element positioned at least partially around the side surface of the screen assembly, the frame element including a front portion, a rear portion, and a side surface that extends between the front portion and the rear portion; and
   a cradle having a rear portion and a frame element covering portion, wherein the frame element covering portion is positioned around at least a portion of the side surface of the frame element, wherein the frame element is configured to break upon an impact to form multiple frame element fragments, and wherein the cradle is configured to contain the multiple frame element fragments and remain intact upon the impact.

2. The monitor assembly of claim 1, wherein the frame element comprises a plastic material.

3. The monitor assembly of claim 1, wherein the cradle comprises a metal.

4. The monitor assembly of claim 1, wherein the cradle comprises a metal alloy or casted material.

5. The monitor assembly of claim 4, wherein the metal alloy comprises at least one of aluminum, magnesium, and zinc.

6. The monitor assembly of claim 1, wherein the screen assembly comprises a touch panel.

7. The monitor assembly of claim 1, wherein the screen assembly comprises a liquid crystal display (LCD) screen.

8. The monitor assembly of claim 1, wherein the frame element covering portion of the cradle is positioned over at least at least 70% of an outer surface portion of the side surface of the frame element.

9. The monitor assembly of claim 1, wherein the frame element covering portion of the cradle is positioned over at least at least 80% of an outer surface portion of the side surface of the frame element.

10. The monitor assembly of claim 1, wherein the cradle encapsulates at least 70% of an outer surface of the frame element.

11. The monitor assembly of claim 10, wherein the cradle encapsulates at least 80% of the outer surface of the frame element.

12. The monitor assembly of claim 1, further comprising a microprocessor printed circuit board (PCB) fully enclosed between the cradle and a rear cover coupled to the rear portion of the cradle.

13. The monitor assembly of claim 12, wherein the cradle is made of a metal and limits the electromagnetic interference.

14. The monitor assembly of claim 1, wherein the cradle lacks cooling holes.

15. The monitor assembly of claim 1, wherein the cradle comprises a single piece of material.

16. The monitor assembly of claim 1, wherein the frame element is bonded to the screen.

17. The monitor assembly of claim 1, wherein the frame element and the cradle are removably coupled to one another via at least one of screws and clips.

18. The monitor assembly of claim 1, wherein the front portion of the frame element comprises a linear edge.

19. The monitor assembly of claim 1, wherein the front portion of the frame element is positioned over a portion of the front face of the screen assembly.

20. A monitor assembly for an In-Flight Entertainment (IFE) system, comprising:
   a screen assembly including a front face, a rear face, and a side surface that extends between the front and rear faces;
   a frame element positioned at least partially around the side surface of the screen assembly, the frame element including a front portion, a rear portion, and a side surface that extends between the front portion and the rear portion;
   a cradle having a rear portion and a frame element covering portion, wherein the frame element covering portion is positioned around at least a portion of the side surface of the frame element; and
   at least one of the following:
     (i) a microprocessor printed circuit board (PCB) fully enclosed between the cradle and a rear cover coupled to the rear portion of the cradle;
     (ii) the cradle being made of a metal and limiting the electromagnetic interference;
     (iii) the cradle comprising a single piece of material;
     (iv) the frame element being bonded to the screen; and
     (v) the front portion of the frame element being positioned over a portion of the front face of the screen assembly.

* * * * *